United States Patent [19]

Schick

[11] Patent Number: 5,182,933
[45] Date of Patent: Feb. 2, 1993

[54] METHOD OF PRODUCING DEVICES FOR INTERCONNECTING CONVEYOR OR SIMILAR BELTS

[75] Inventor: Jean-Francois Schick, Paris, France
[73] Assignee: Goro S. A., Chelles Cedex, France
[21] Appl. No.: 758,877
[22] Filed: Sep. 10, 1991
[30] Foreign Application Priority Data Sep. 10, 1990 [FR] France .................. 90 11171

[51] Int. Cl.$^5$ .............................................. B21D 28/06
[52] U.S. Cl. ............................................ 72/335; 72/339; 72/404; 24/33 B; 24/33 P; 29/11
[58] Field of Search ............... 72/404, 335, 336, 339, 72/379.2; 24/33 P, 33 B, 33 R, 31 R, 31 L, 31 F; 29/11

[56] References Cited

U.S. PATENT DOCUMENTS

| | | |
|---|---|---|
| 2,112,312 | 3/1938 | Smith ........................................ 29/11 |
| 3,011,466 | 12/1961 | Simpelaar ............................. 72/339 |
| 3,514,941 | 6/1970 | Mueller . |
| 4,060,877 | 12/1977 | Schick ................................. 24/33 B |
| 4,719,788 | 1/1988 | Musil .................................... 29/11 |
| 4,942,645 | 7/1990 | Musil .................................. 24/33 B |

FOREIGN PATENT DOCUMENTS 2051650 9/1971 Fed. Rep. of Germany ........ 72/339
2342432 9/1979 France .

Primary Examiner—Daniel C. Crane
Attorney, Agent, or Firm—Herbert Dubno

[57] ABSTRACT

This method relates to the production of connectors each embodied by a row of substantially U-shaped clips formed in their curved part with a row of regularly spaced-apart apertures which separate the hinge elements from one another. The following metal deep drawing and pressing operations are performed consecutively in the central part of a metal strip, forming an aperture of reduced cross-section in the center of the place intended for each aperture required to be present between two hinge elements; widening each such aperture and pressing in the edges to form a collar which projects from a surface of the strip; bending the sides of each collar around on to the corresponding surface of the metal strip; and bending the strip round into a U-shape by the surface towards which the collar edges have been bent round being inwardly directed. The inside surface of each hinge element is, therefore, strengthened by two metal strips which are disposed one beside another and which correspond to the bent-round contiguous sides of the two collars previously formed at the apparatus and extending around the particular hinge element.

7 Claims, 2 Drawing Sheets

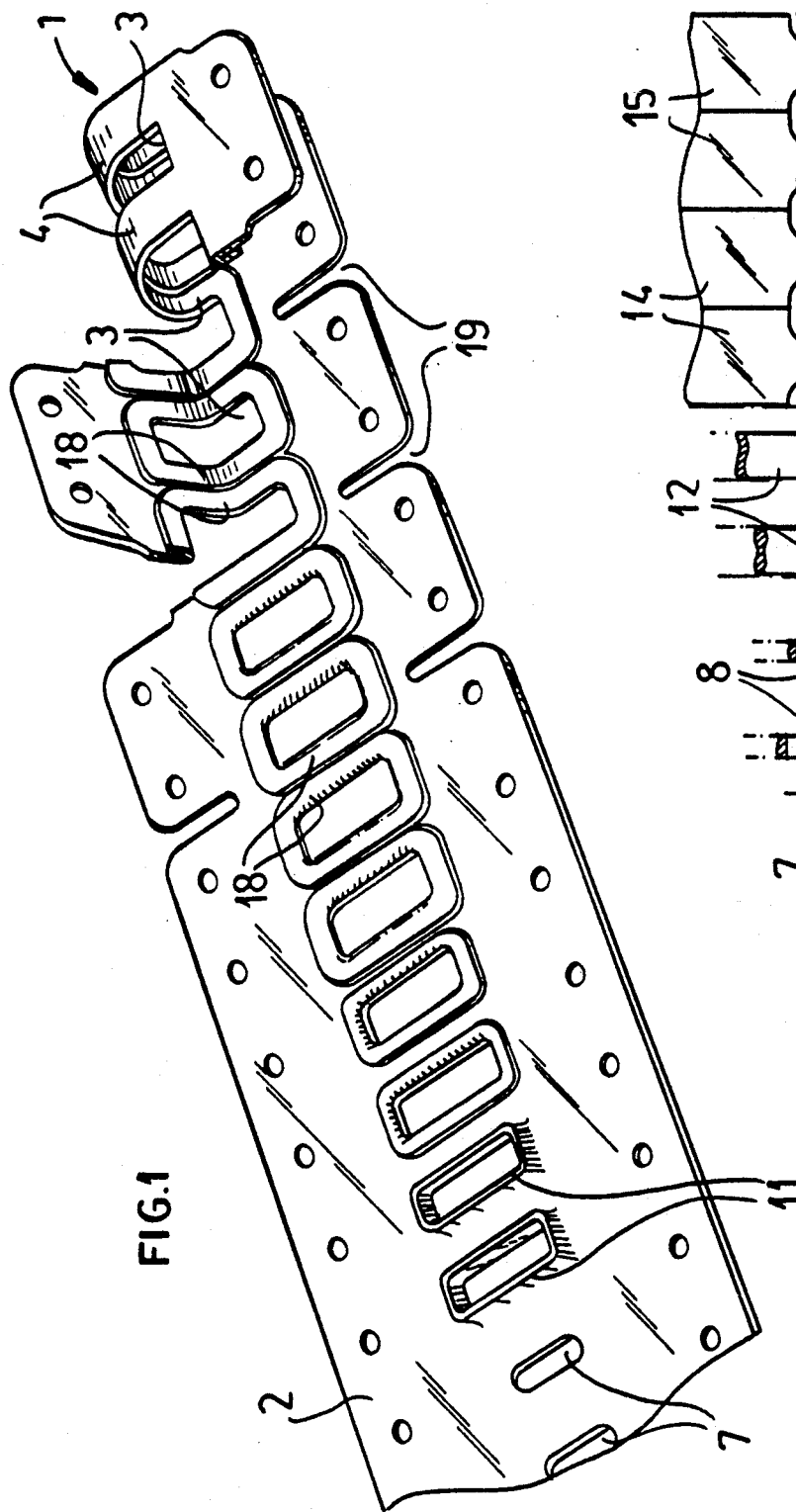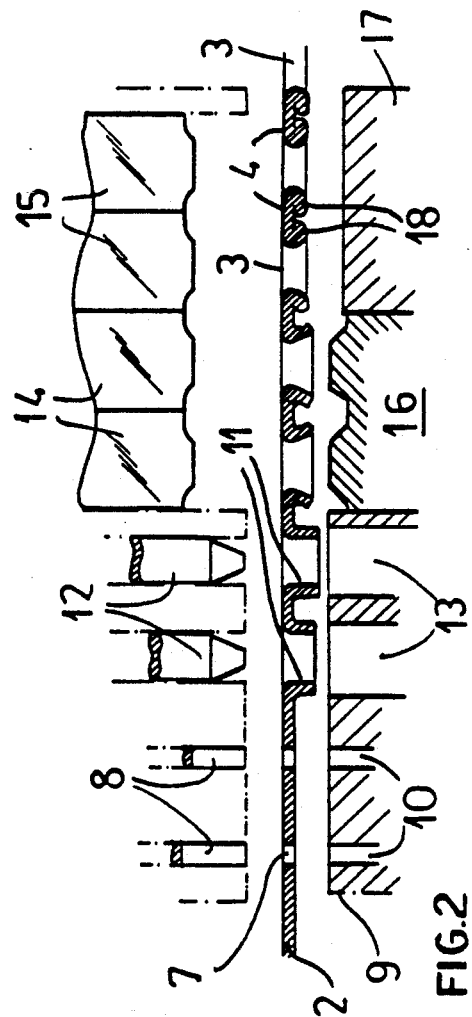

METHOD OF PRODUCING DEVICES FOR INTERCONNECTING CONVEYOR OR SIMILAR BELTS

FIELD OF THE INVENTION

My present invention relates to connectors or fasteners for interconnecting the ends of a conveyor or similar belt, i.e. a so-called flat belt.

More particularly, the invention relates to a means comprising a row of interconnected substantially U-shaped metal clips such that such clips can engage respective edges of a conveyor or similar flat belt at juxtaposed ends, the clips being formed in their curved part with a row of evenly spaced-apart apertures which separate hinge elements from one another. The two ends of a conveyor belt can, therefore, be interconnected by a connector of this kind secured to each end, then arranging for the hinge elements of the connectors to overlap or interdigitate so that they can be joined together by means of a pivot pin.

BACKGROUND OF THE INVENTION

Conventional clips of this kind are usually produced by cutting and deep drawing a metal strip. However, the apertures between the hinge elements are inconvenient, since they reduce the mechanical strength of the clips precisely at a place where the clip is subject to severe forces. Also the hinge elements wear at this place because they rub on the pivot pin which is usually made of a very strong metal.

To obviate this disadvantage, it has already been suggested that connecting clips of this kind be prepared from a strip material having a special section, its cross-section increasing considerably at the place where the hinge elements are formed. Unfortunately, this greatly increases production costs, because a strip material having a varying thickness and a special cross-sectional shape is required.

French Patent 2 342 432 suggests that the curved part of each clip which is intended to act as a hinge element, itself be folded, the two arms of the resulting fold being placed one on another perpendicularly to the main plane of the two fixing loops. In fact, this helps to increase considerably the mechanical strength of the hinge elements, the uncoupling of each one of them on both sides, resulting in the necessary space being available for engaging the hinge elements of the clips of the other row.

OBJECTS OF THE INVENTION

It is an important object of the present invention to provide a belt-end fastener which obviates the aforedescribed disadvantages.

It is another object of the invention to provide an improved belt-end fastener in which the hinge elements of the connecting clips are greatly reinforced by comparison with prior art systems.

SUMMARY OF THE INVENTION

The invention, therefore, relates to a production method, distinguished in that the central part of a metal strip is treated consecutively in the following deep metal drawing and pressing operations:

forming an aperture of reduced cross-section in the center of the place intended for each aperture required to be present between two hinge elements;

widening each such aperture and punching out the edges to form a projecting collar which extends around the corresponding aperture;

bending the sides of each collar around onto the corresponding surface of the metal strip; and bending the strip round into a U-shape by the surface towards which the collar edges have been bent round long inwardly directed.

More particularly, the invention comprises the steps of:

(a) forming a row of spaced-apart apertures in a central portion of a metal strip;

(b) widening each of the apertures by pressing an edge portion of the metal strip surrounding each aperture transversely to the strip, thereby forming a collar around each aperture;

(c) bending sides of each collar outwardly from the respective aperture to lie against a surface of the strip adjacent the respective aperture, thereby forming an outwardly bent frame around each aperture; and (d) thereafter bending the strip into a U-shape about a longitudinal axis parallel to the strip to render the surface concave and bend opposite longitundinal edges of each of the frames inwardly, thereby forming U-shaped hinge elements separated by the apertures, interdigitatable with corresponding hinge elements of a second such strip to be joined to the first-mentioned strip by a hinge pin and reinforcing each of the elements along an interior of a respective bend by two of the longitudinal edges alongside one another of frames of successive apertures along the strip, the longitudinal edges of the frames of each element extending over substantially a full length thereof.

The inside surface of each hinge element or row of clips produced by this method is, therefore, strengthened by two metal strips which are disposed one beside the other and which correspond to the bent-over contiguous sides of the two collars previously formed at the place of the apertures and extending around the particular hinge element concerned.

The apparatus can comprise:

means for stepping the strip past a plurality of stations for effecting the method steps previously described;

a plurality of deep drawing ram tools above the strip at each of the stations for widening each of the apertures and bending sides of each collar outwardly; and a respective anvil below the strip and a respective one of the ram tools for cooperating therewith in shaping the strip adjacent a respective the aperture, each of the anvils having recess of a shape corresponding to a shape imparted to the strip adjacent the respective aperture.

The belt-end fastener of the invention comprises:

a row of outwardly bowed space-apart U-shaped hinge elements separated by respective gaps and adapted to interdigitate with a corresponding end fastener on an another belt end so that a pin inserted into the fasteners holds the belt ends together; and a pair of bent-over reinforcing edges of the strip along an inner side of each element lying adjacent one another and forming parts of respective frames around apertures in the strip defining the gaps upon a bending of the strip into the U-shaped cross section.

BRIEF DESCRIPTION OF THE DRAWING

The above objects, features and advantages of my invention will become more readily apparent from the following description, reference being made to the accompanying drawing in which:

FIG. 1 is a perspective view of a connector during production;

FIG. 2 is a sectional view in side elevation of the complementary cutting and drawing tools used in this production;

SPECIFIC DESCRIPTION

Figure 3:
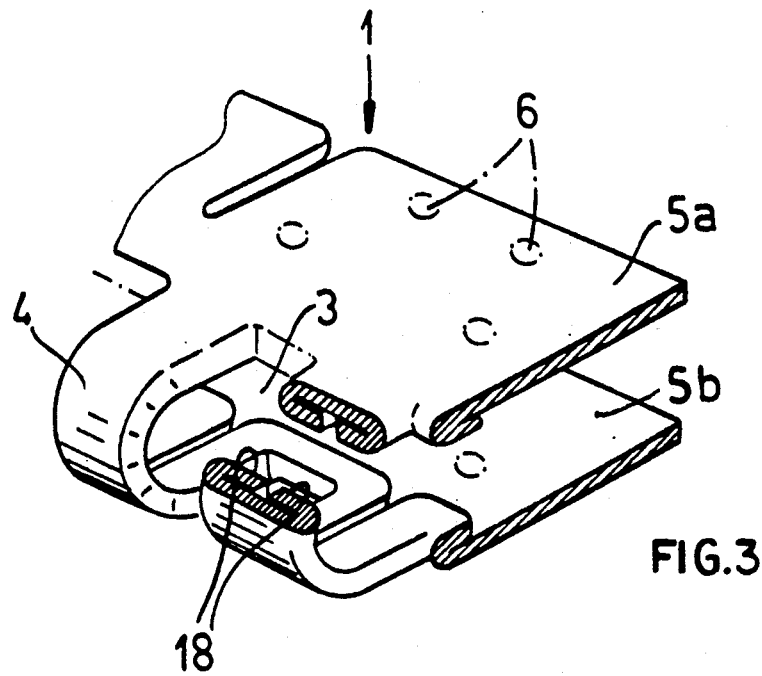
FIG. 3 is a perspective view of a finished clip of such a connector.
Figure 4:
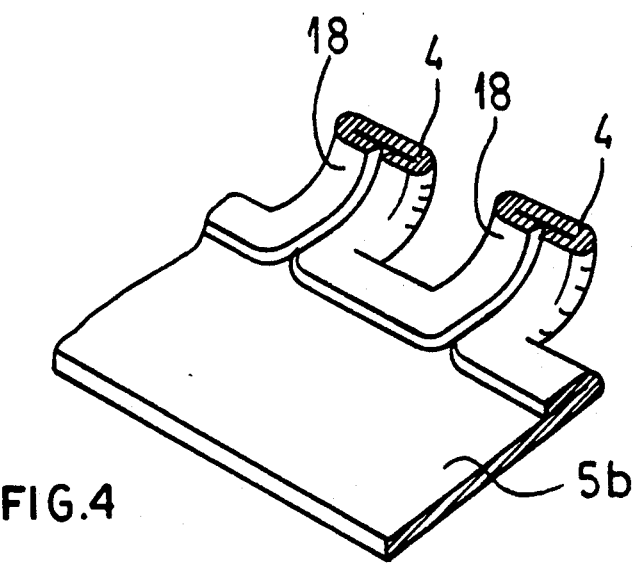
FIG. 4 is a partial perspective view of the inside surface of one of the arms of such a clip after it has been cut at the place for the hinge elements.

As already state, the method according to the invention relates to the production of connectors each embodied by a row of substantially U-shaped clips 1 and produced by a sequence of cutting and deep drawing operations on a metal strip 2. The clips 1 are formed in their curved part with a row of apertures 3 separating from one another hinge elements 4 adapted to overlap the corresponding hinge elements of another similar row of clips. Also, the two arms 5a, 5b of each clip 1, the latter arms being disposed one above another, are formed with apertures 6 through which rivets or fixing staples will subsequently extend in order to fix the clips reliably to one of the end parts of a conveyor belt.

Figure 5:
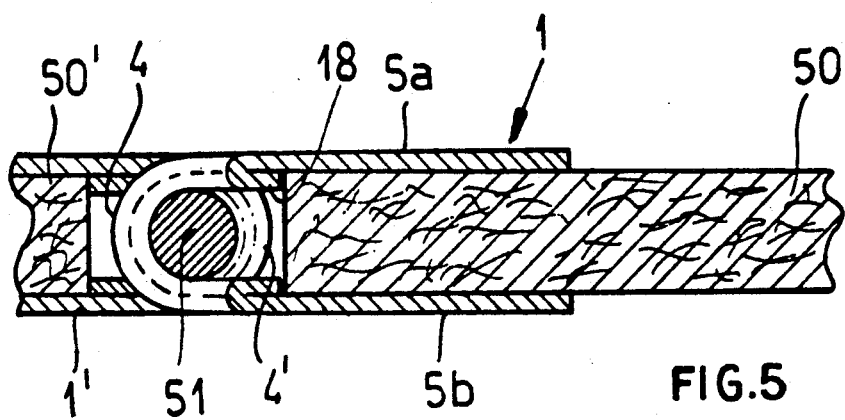
FIG. 5 is a side view of the top and end part of the same clip.

FIG. 5, for example, clips 1 and 1' of two ends, 50, 50' of a belt are joined by interdigitating the clips and inserting a hinge pin 51 through the interdigitized elements.

In the method according to the invention, the first production operation is to form a small rectangular cross-section aperture 7 at the center of the place intended for each aperture 3, i.e. in the central part of the strip 2. In FIGS. 1 and 2, two apertures 7 and produced simultaneously in this way by means of punches 6 disposed opposite a stationary anvil 9 having corresponding channels or the like 10.

After this first operation, the edges of the two resulting apertures 7 are so crowed or upset inwardly that a kind of collar 11 is formed around each aperture 7. This operation is performed simultaneously for two apertures 7 by means of two drifts 12 disposed opposite the two recesses 13 in the anvil 9. Upon the completion of the operation, the resulting collars 11 project beyond that surface of the strip 2 which is near the anvil 9.

The two operations just described and the subsequent operation are carried out as the strip 2 advances stepwise between the anvil 9 and the drifts or other strip-treating tools.

After the collars 11 have been impressed the collar edges are bent round towards the strip surface opposite the anvil 9. This operation is performed by the corresponding parts of the strip 2 passing between two pairs of complementary drawing tools disposed on the top part and bottom part. The two top tools, 14, 15 are drawing dies. The bottom tools 16, 17 are effective as additional anvils and the anvils 16 are formed with impressions to initiate the bending round of the sides of the collars 11; the anvil 17 is a finishing anvil.

On the completion of the latter operation, the inside surface of each hinge element 4 is strengthened by two side-by-side metal strips 18 which correspond to the contiguous bent-round sides of the collars 11 previously formed at the place of the two apertures 3 and framing the particular hinge element 4 concerned (see drawings). The metal strips bent round towards the inside surface of each hinge element 4 preferably abut one another firmly. However, there may be a gap between them.

After the notches 19 or incisions for separating the various clips 1 have been contrived consecutively, the strip 2 is curved and bent around itself in a U-shape to give the clips their final shape. The number and shape of the clips and the number of their hinge elements can, of course, vary.

Clips produced by means of this method have the advantage that the inside surface of each of their hinge elements 4 is strengthened by two metal strips which are, of course, of the same thickness and which would otherwise have been wasted, since they were formed from a metal part at the place of the punch-outs 3 between two hinge elements 4. The mechanical strength of the hinge elements is, therefore, increased considerably and so the same experience less wear, more particularly, wear resulting from rubbing subsequently on the pivot pin interconnecting the two complementary connectors.

The method according to the invention enables the starting material used to be a much thinner metal strip than in the conventional methods since the hinge elements are strengthened by the bending round of the metal below them. Also, since the choice of hinge element width is no longer related to the thickness of the metal used, the strength of the hinge elements is optimized, in contrast, to their wear by friction on the connecting pin. Also, another indirect advantage provided by the reduction in metal thickness is that the resulting thinner arms of the clips make it easier to lead them through below the scrapers disposed above the conveyor belts. The clips are also called belt connectors or fasteners.

I claim:

1. A method of making a belt end fastener, comprising the steps of:
    (a) forming a row of spaced-apart apertures in a central portion of a metal strip;
    (b) widening each of said apertures by pressing an edge portion of the metal strip completely surrounding each aperture transversely to said strip, thereby forming a collar all around each aperture;
    (c) bending sides of each collar outwardly from the respective aperture to lie against a surface of said strip adjacent the respective aperture, thereby forming an outwardly bent frame all around each aperture; and
    (d) thereafter bending said strip into a U-shape about a longitudinal axis parallel to the strip to render said surface concave and bend opposite longitudinal edges of each of said frames inwardly, thereby forming U-shaped hinge elements separated by said apertures, interdigitatable with corresponding hinge elements of a second such strip to be joined to the first-mentioned strip by a hinge pin and reinforcing each of said elements along an interior of a respective bend by bringing two of said longitudinal edges adjacent one another of frames of successive apertures along the strip, said longitudinal edges of said frames of each element extending over substantially a full length thereof.

2. The method defined in claim 1 wherein steps (a) through (d) are carried out in succession on said strip as said strip is stepped past respective stations at which said steps are performed and while said strip is simultaneously acted upon at said stations.

3. The method defined in claim 2 wherein said longitudinal edges of said frames are flattened against said surface in step (c).

4. The method defined in claim 3 wherein said apertures are formed as rectangular windows elongated in a direction transverse to a longitudinal dimension of said strip.

5. The method defined in claim 4, further comprising the step of forming said strip with a row of holes along each longitudinal edge of said strip for accommodating means for connecting said fastener to a belt end.

6. The method defined in claim 5, further comprising incising said strip inwardly from longitudinal edges thereof on opposite sides of a pair of said elements.

7. An apparatus for making a belt end fastener, by the steps of:
   (a) forming a row of spaced-apart apertures in a central portion of a metal strip;
   (b) widening each of said apertures by pressing an edge portion of the metal strip surrounding each aperture tranversely to said strip, thereby forming a collar around each aperture;
   (c) bending sides of each collar outwardly from the respective aperture to lie against a surface of said strip adjacent the respective aperture, thereby forming an outwardly bent frame around each aperture;
   (d) thereafter bending said strip into a U-shaped about a longitudinal axis parallel to the strip to render said surface concave and bend opposite longitudinal edges of each of said frames inwardly, thereby forming U-shaped hinge elements separated by said apertures, interdigitatable with corresponding hinge elements of a second such strip to be joined to the first-mentioned strip by a hinge pin and reinforcing each of said elements along an interior of a respective bend by two of said longitudinal edges alongside one another of frames of successive apertures along the strip, said longitudinal edges of said frames of each element extending over substantially a full length thereof, said apparatus comprising:

means for stepping said strip past a plurality of stations for effecting said steps;

a plurality of deep drawing ram tools above said strip at each of said stations for widening each of said apertures and bending sides of each collar outwardly; and a respective anvil below said strip and a respective one of said ram tools for cooperating therewith in shaping said strip adjacent a respective said aperture, each of said anvils having recess of a shape corresponding to a shape imparted to said strip adjacent the respective aperture.

* * * * *